UNITED STATES PATENT OFFICE.

OLIVER H. CASTLE, OF INDIANAPOLIS, INDIANA.

AIR OR GAS COMPRESSOR.

1,036,797.  Specification of Letters Patent.  Patented Aug. 27, 1912.

Application filed October 10, 1910. Serial No. 586,246.

*To all whom it may concern:*

Be it known that I, OLIVER H. CASTLE, a citizen of the United States, residing at Indianapolis, in the county of Marion and State of Indiana, have invented a new and useful Air or Gas Compressor, of which the following is a specification.

The object of my invention is to produce a valveless fluid pump, more especially designed for air or gas compression.

The accompanying drawings illustrate my invention.

Figure 1 is an axial section of a complete structure embodying my invention; Fig. 2 a section on line 2—2 of Fig. 1; Fig. 3 a section on line 3—3 of Fig. 1; Fig. 4 a perspective fragmentary detail of the means for rocking the compression piston; Fig. 5 a fragmentary perspective detail of the arm carried by the compression piston stem; Fig. 6 a sectional detail on line 6—6 of Fig. 1 of the thrust head, and Fig. 7 a miniature elevation of the compression piston.

In the drawings, 10 illustrates an open-ended cylinder having an admission passage 11 formed on one side and an exhaust passage 12 formed on the other. Passage 11 communicates with the interior cylinder 10 through two separated ports 13, 13 and passage 12 similarly communicates with the interior of cylinder 10 through two separated ports 14, 14. It will be understood that the construction shown herein is for a double ended construction. Mounted within cylinder 10 is an elongated piston 15 which is tubular at each end and provided with a central imperforate partition 16. Mounted at each end of cylinder 10 is a head 17 provided with a cylindrical spud or plug 18 which projects into the cylinder by an amount substantially equal to the depth of either hollow end of piston 15. Formed through the wall of piston 15, upon each side of partition 16, are two inlet ports 19 and two exhaust ports 21 adapted, by a rocking or slight turning of the piston, to register with the passages 13 and 14 respectively, during axial reciprocation of the piston. The spuds 18 of heads 17 may be hollow if desired and may communicate with a water jacket 22 surrounding cylinder 10.

Piston 15 is provided with a piston rod 23 which is extended through a suitable gland 24 carried by one of the heads 17 and at its outer end is connected to a cross head 25. The stem 23 must be rotatively connected with the cross head 25 and I therefore provide the following construction: The tip of stem 23 is threaded as indicated at 26 and clamped upon this threaded portion is a two-part clamp 27 ensmalled at its middle to form a journal 28. A clamp 29' forming part of head 25 is provided with a bearing within which journal 28 may oscillate. A thrust bearing 32 is inserted between one end of clamp 27 and an adjacent portion of cross head 25 and a similar thrust bearing 33 is arranged between an adjacent portion of cross head 25 and a nut 34 mounted on thrust 26, the arrangement being such that the thrust of the cross head 25 may be readily transmitted in both directions to the piston rod 23 at the same time leaving said piston rod free to be turned by its axle.

Any suitable means may be provided for reciprocating the cross head 25 and rocking rod 23 at the ends of the stroke, but I prefer to use the structure illustrated in the drawings. In this structure I provide a triangular pitman 41 connected at 42 to cross head 25, at 43 with the crank 44 of crank shaft 45, and at 46 with the pitman 47 connected to the stem 48 of engine 49 which may be either a steam engine or an internal combustion engine. Stem 48 carries a cross head 51 which is projected up adjacent piston rod 23 and this head is provided in its upper surface with a diagonally arranged cam slot 52 formed to receive the end 53 of an arm 54 secured to piston rod 23. By this arrangement piston rod 48 has an initial movement, at each end of its stroke, before there is any movement of piston rod 23 and there is, therefore, a movement of cross head 51 relative to arm 54 which results in a turning or rocking of piston 15 immediately prior to the reversal of direction of axial movement of the piston 15, thus serving to alternate the registry of the inlet and exhaust passages 19 and 21 with their respective ports 13 and 14. By this arrangement, I am able to reduce the clearance within the compression cylinder 10 to a negligible amount thus materially increasing the efficiency of the structure.

I claim as my invention:

1. In a compressor, the combination of a cylinder having exhaust and admission ports through the side walls thereof, a compressor piston mounted in said cylinder and provided with a tubular extension having exhaust and admission passages formed therethrough to alternately register, by oscillation of the piston, with the exhaust and admission ports, said tubular portion having its interior outwardly tapered, a correspondingly tapered imperforate head for said cylinder extending into the tubular portion of the piston, and means for oscillating said piston at the ends of its axial stroke.

2. In a compressor, the combination of a cylinder having exhaust and admission ports through the side walls thereof, a compressor piston mounted in said cylinder and provided with a tubular extension having exhaust and admission passages formed therethrough to alternately register, by oscillation of the piston, with the exhaust and admission ports, a head for said cylinder extending into the tubular portion of the piston, a reciprocating power piston, intermediate connections between said power piston and the compressor piston for producing axial reciprocation of said compressor piston, and intermediate connections between said power piston and compressor piston for producing angular movement of the compressor piston at the ends of its stroke.

3. In a compressor, the combination of a cylinder having exhaust and admission ports through the side walls thereof, a compressor piston mounted in said cylinder and provided with a tubular extension having exhaust and admission passages formed therethrough to alternately register, by oscillation of the piston, with the exhaust and admission ports, a head for said cylinder extending into the tubular portion of the piston, means for oscillating said piston at the ends of its axial stroke, a reciprocating power-piston, a crank shaft, a triangular pitman connecting the two pistons with the crank, a cam, and a coöperating arm, one carried by the power-piston and the other by the compressor piston for producing angular movement of the compressor piston by axial movement of the power-piston relative to axial movement of the compressor piston.

4. In a compressor, the combination of a cylinder and associated piston, said piston having a tubular end the interior of which is outwardly tapered, a hollow inwardly tapered head for said cylinder over which the tubular portion of the piston may sleeve, the tubular portion of the piston having exhaust and admission ports formed therethrough and arranged for alternate registry by oscillation and reciprocation with exhaust and admission ports formed through the cylinder wall, and a water jacket surrounding the cylinder and communicating with the interior of the head.

5. In a compressor, the combination of a cylinder and associated piston, said piston having a tubular end, a hollow head for said cylinder over which the tubular portion of the piston may sleeve, the tubular portion of the piston having exhaust and admission ports formed therethrough and arranged for alternate registry by oscillation and reciprocation with exhaust and admission ports formed through the cylinder wall, and a water jacket surrounding the cylinder and communicating with the interior of the head.

6. In a compressor, the combination of a power cylinder, a reciprocating piston mounted therein, a compressor cylinder, a reciprocatory and oscillatory piston mounted therein, a crank shaft, intermediate connections between the crank shaft and both of the reciprocating pistons whereby concurrent reciprocation of said pistons may be had, and intermediate connections between the two pistons whereby longitudinal movement of the one relative to the other will produce oscillation of one of said pistons.

7. In a compressor, the combination of a power cylinder, a reciprocating piston mounted therein, a compressor cylinder, a reciprocatory and oscillatory piston mounted therein, a crank shaft, a head carried by one of said pistons and having a transversely inclined guide-way therein, a head carried by another of said pistons and projected into said inclined guide-way, and a three-point lever pivoted upon the crank shaft and pivotally connected to each of the reciprocating pistons.

In witness whereof, I, have hereunto set my hand and seal at Indianapolis, Indiana, this fourth day of October, A. D. one thousand nine hundred and ten.

OLIVER H. CASTLE. [L. S.]

Witnesses:
   Thomas W. McMeans,
   Frank A. Fahle.